May 22, 1951  J. HUBER  2,554,191
CENTRIFUGAL PUMP
Filed Aug. 8, 1947
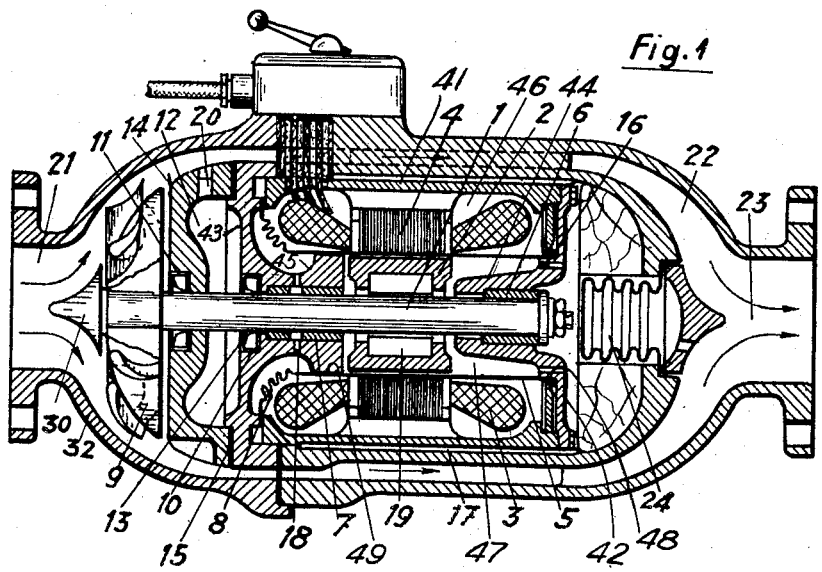
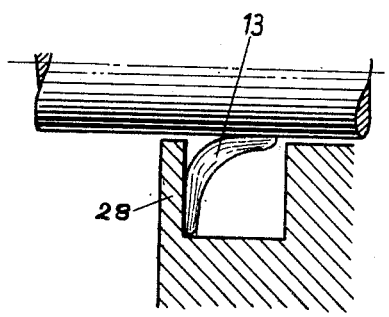
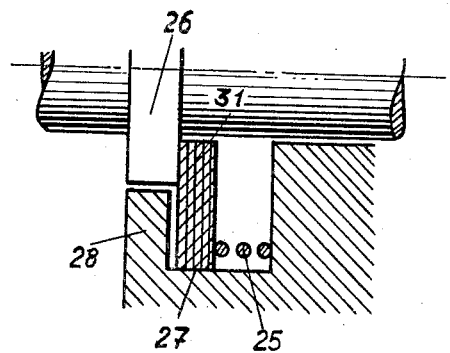
Inventor:
Jakob Huber,
By: Pierce, Scheffler & Parker,
Attorneys.

Patented May 22, 1951

2,554,191

UNITED STATES PATENT OFFICE 2,554,191

CENTRIFUGAL PUMP

Jakob Huber, Ennetbaden, Switzerland

Application August 8, 1947, Serial No. 767,517
In Switzerland June 1, 1945

Section 1, Public Law 690, August 8, 1946
Patent expires June 1, 1965

2 Claims. (Cl. 103—87)

Electrically driven centrifugal pumps without stuffing-boxes are known, where the bearings are swept over by the liquid which is being pumped. Apart from the fact that such pumps can not be used for liquids which attack the shaft and bearing metal, this kind of lubrication results in greater friction in the bearings than when oil lubrication is provided. It is therefore, not suitable for larger pumping units, and does not prevent the bearings from becoming dirtied by solid particles contained in the liquid passing through the pump.

Attempts have been made to overcome these disadvantages by extending the shaft so as to be able to arrange the bearings some distance away from those parts of the pump which convey the liquid. With such an arrangement the overall length of the pump becomes greater.

The present invention concerns an electrically driven centrifugal pump without stuffing-boxes where the stator winding is immersed in an insulating liquid, the invention being characterised by the feature that the rotor of the electric motor runs in oil which flows around both bearings of the centrifugal pump set, and between the pump and the motor bearing on the pump side means and at least one annular liquid-receiving space which surrounds the shaft are provided, these serving the purpose of making it difficult for the oil to mix with the liquid conveyed by the pump.

These means consist for instance of at least one seal which hinders the passage of the oil and is located within a narrow part of the casing between the pump and the bearing on the pump side, this narrow part of the casing surrounding the shaft as closely as possible without however being in contact with it. Between two such narrow parts there is a chamber formed by the casing which surrounds the shaft and in which any liquid is retained which passes through the outer seal. The oil which lubricates the bearings remains inside the driving motor even when there is no pump liquid present because the surface tension prevents it from escaping through the seals. By cooling the restricted parts containing the seals it is possible to improve still further the seals, this being of special importance when the pump is used for pumping hot liquids. Instead of using single seals it is possible to provide a labyrinth-gland which surrounds the shaft between the motor and the pump chambers.

A constructional example of the invention is illustrated in the drawing. Fig. 1 shows a longitudinal section through a centrifugal pump such as is used for circulation purposes in a heating system, while Figs. 2 and 3 show two forms of seal in section to a larger scale.

The rotor 2 fixed to the shaft 1 is constructed as a squirrel-cage rotor and is caused to rotate by the rotating field of the stator winding 3 of stator 4 mounted in motor casing 41. The ends of the motor casing 41 are closed by end walls 42 and 43 defining therewith an oil filled chamber. The end walls 42 and 43 are formed with inwardly projecting bearing bosses 44 and 45 mounting bearings 6 and 7, respectively for rotor shaft 1. A stationary thin walled cylindrical partition member 5 extends between the rotor 2 and stator 4 and divides the oil filled chamber into mutually isolated stator and rotor spaces 46 and 47, respectively. The cylindrical partition member 5 is supported and centered by engagement with annular seats 48 and 49, respectively, on the bearing bosses 44 ad 45 and at one end is formed with a flared corrugated expansible portion 8, the terminal end of which is clamped and sealed between the end wall 43 and one end of the motor casing. The flexibility of the portion 8 accommodates changes in volume of the stator oil caused by temperature changes. Due to the low mechanical stresses occurring in the element 5 when there are any pressure differences between the stator and the rotor chamber, the cylinder 5 inside the air gap can be made very thin, so that it hardly affects the electrical properties of the motor. No special type of rotor is therefore necessary such as is the case with centrifugal pumps having an axial flow.

The bearing 7 at the pump side as well as the bearing 6 at the outlet end are constructed as plain bearings and the former is separated from the pump rotor 9 by the two restricted parts 10, 11 between which there is a chamber 12. The passage of liquid, either in the form of rotor oil or pump liquid, past these restricted parts 10, 11 can as shown in Fig. 1 be prevented by the insertion of seals. Fig. 2 shows in detail a constructional form of seal for the restricted part at the motor side. Seals consisting for instance of conical leather sleeves 13 which surround the shaft and have their tapered end pointing towards the motor, possess the advantage that when subjected to external pressure they tend to press against the narrow part 28 of the casing and thus prevent the rotor oil from escaping. Changes in the volume of the rotor oil produced by temperature variations are compensated by the flexible wall 24. Any liquid which might pass through the seal at the restricted part 11, remains in 12 the oil-filled chamber, and does not reach the rotor space.

Instead of leather sleeves it is also possible to employ valves subjected to a light spring pressure, in order to prevent oil from escaping or pump liquid from entering. A seal of this kind is illustrated in Fig. 3. The valve disc 31 subjected to the pressure of a weak spring 25, is pressed against the shaft collar 26 and the surface 27 of the narrow part 28 of the casing and prevents the passage of any liquid. The seal is particularly effective when there is a lower pressure at the pump side.

When the liquid passing through the pump is heavier than the rotor oil, it is expedient to arrange the pump vertically with the pump part below. The oil is then forced into the motor by the hydrostatic lift. The reverse applies in the case of light pump media, for instance gases. The pump section 9, 14 can easily be removed from the motor section at the joint 15, so that the motor section also may be used without alteration for other kinds of pumps, for instance gear pumps. After removing the casing part 32 and the element 30 which is adapted to the flow conditions, the pump rotor 9 and the pump section 14 fixed at the joint 15 can then be withdrawn and replaced by another form of pump. The channels 16, 17 and 18 enable the rotor oil to circulate and to be cooled.

The electric rotor can be provided with internal curved surfaces, like a screw pump, and thus force the oil to circulate. After removing the casing part 32, oil can be filled into the chamber 12 by way of the opening 20.

With the constructional form shown in the drawing, the pump liquid passes from the opening 21 through the pump rotor 9 and the channels 22 to the axial outlet 23, so that the complete circulating pump can readily be built into a pipe line and occupies a minimum amount of space.

I claim:

1. A submerged centrifugal electric motor pump unit comprising a cylindrical motor casing, a cylindrical stator mounted in said motor casing, end walls closing the ends of said motor casing having coaxial bearing bosses carried thereby and with said casing defining an oil filled chamber, a rotor shaft journalled in said bearings, a rotor mounted on said rotor shaft between said end walls, a stationary thin walled cylindrical partition member extending between the rotor and the stator and dividing the oil-filled chamber into mutually isolated stator and rotor spaces, said rotor shaft extending through and beyond one of said end walls, sealing means for the shaft carried by said wall outwardly of the bearing portion thereof to confine the oil within the rotor space, a cap member sealingly secured to the last mentioned end wall and defining therewith a fluid filled sealing chamber surrounding the rotor shaft, said cap member having an axial bore through which the rotor shaft extends, sealing means for the shaft carried by the cap for confining the fluid in the sealing chamber and a pump impeller secured on the end of said rotor shaft.

2. A submerged centrifugal electric motor pump unit comprising a cylindrical motor casing, a cylindrical stator mounted in said motor casing, end walls closing the ends of said motor casing having coaxial bearing bosses carried thereby and with said casing defining an oil filled chamber, a rotor shaft journalled in said bearings, a rotor mounted on said rotor shaft between said end walls, a stationary thin walled cylindrical partition member extending between the rotor and the stator and dividing the oil filled chamber into mutually isolated stator and rotor spaces, said cylindrical partition member being supported and centered by engagement with the bearing bosses on said end walls and having a flared expansible end portion at one end fastened and sealed between one of said end walls and the adjacent end of the motor casing, said rotor shaft extending through and beyond one of said end walls, said latter end wall having an annular groove formed therein surrounding said shaft outwardly of the bearing portion thereof, a resilient mechanical sealing member confined in said groove engaging the walls thereof and said shaft to confine the oil in said rotor space, a cap member sealingly secured to said last mentioned end wall and defining therewith a fluid filled sealing chamber surrounding said rotor shaft, said cap member having an axial bore through which the end of said rotor shaft extends and being formed with an annular groove surrounding said shaft, a resilient mechanical sealing member confined in said groove engaging the walls thereof and said shaft to prevent egress or ingress of fluid along said rotor shaft and a pump impeller secured on the end of said rotor shaft.

JAKOB HUBER.

REFERENCES CITED

The following references are of record in the file of this patent:

UNITED STATES PATENTS

| Number | Name | Date |
|---|---|---|
| 1,347,732 | Cooper | July 27, 1920 |
| 2,243,208 | Hawley | May 27, 1941 |
| 2,404,783 | Blom | July 30, 1946 |
| 2,423,436 | Blom | July 8, 1947 |